United States Patent [19]

Fritzsche

[11] Patent Number: 4,688,413

[45] Date of Patent: Aug. 25, 1987

[54] APPARATUS FOR CONTINUOUSLY FORMING EDGEWISE WOUND SALIENT POLE CORES

[75] Inventor: Harold L. Fritzsche, Fort Wayne, Ind.

[73] Assignee: General Electric Company, Fort Wayne, Ind.

[21] Appl. No.: 782,486

[22] Filed: Oct. 1, 1985

Related U.S. Application Data

[63] Continuation-in-part of Ser. No. 660,211, Oct. 12, 1984, Pat. No. 4,613,780.

[51] Int. Cl.$^4$ ...................... B21D 11/06; H02K 15/00
[52] U.S. Cl. .......................................... 72/142; 29/736
[58] Field of Search ................ 29/592, 596, 605, 609, 29/732, 736; 72/135, 142

[56] References Cited

U.S. PATENT DOCUMENTS

| | | | |
|---|---|---|---|
| 1,920,354 | 8/1933 | Carpenter | 171/252 |
| 2,908,965 | 10/1959 | Platt | 29/155.5 |
| 3,152,629 | 10/1964 | Rediger | 72/142 |
| 3,206,964 | 9/1965 | Hart et al. | 72/142 |
| 3,842,493 | 10/1974 | Ohuchi et al. | 29/596 |
| 4,116,033 | 9/1978 | Iwaki et al. | 72/142 |

Primary Examiner—E. Michael Combs
Attorney, Agent, or Firm—Ralph E. Krisher, Jr.

[57] ABSTRACT

Apparatus for continuously forming edgewise wound salient pole cores from a continuous lanced strip of generally thin ferromagnetic material. The lanced strip includes a yoke section extending generally lengthwise thereof and having a pair of sets of segments therein with the segments of one of the segment sets being integrally interposed between the segments of the other of the segment sets, and a set of salient pole teeth integral with the segments of the one segment set so as to extend generally laterally from the yoke section. The apparatus has a pair of means operable generally for effecting generally edgewise deformation of only the segments of the other segment set in the yoke section of the lanced strip upon the continuous passage of at least the yoke section between the edgewise deformation effecting means.

28 Claims, 12 Drawing Figures

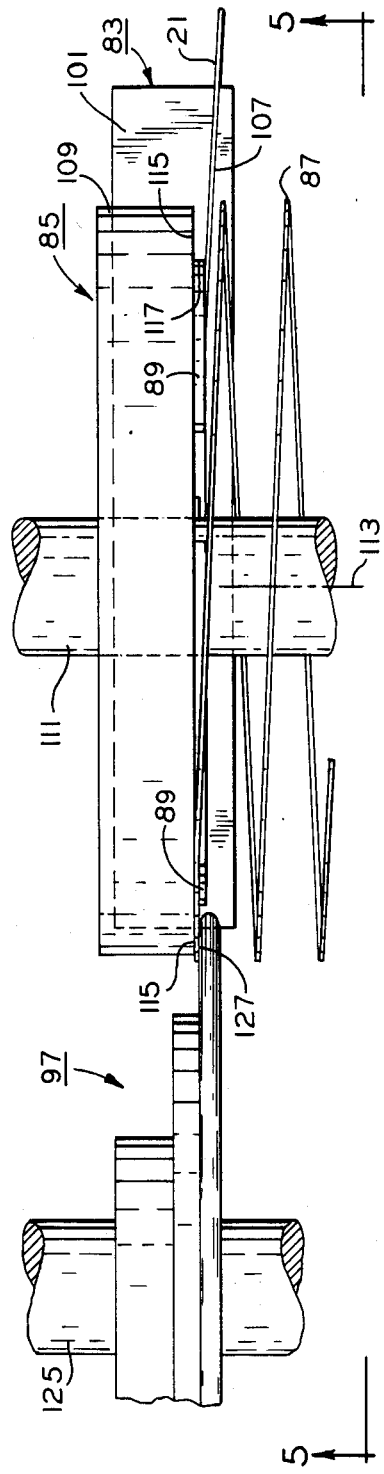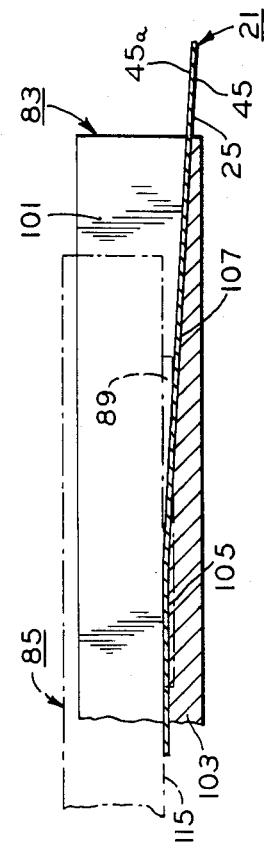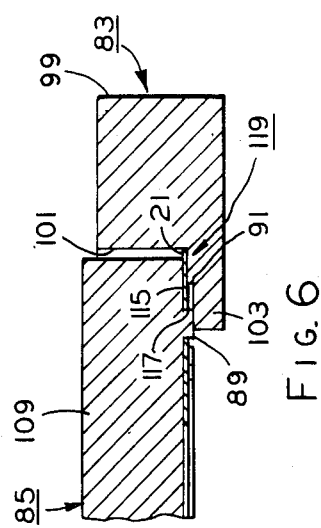

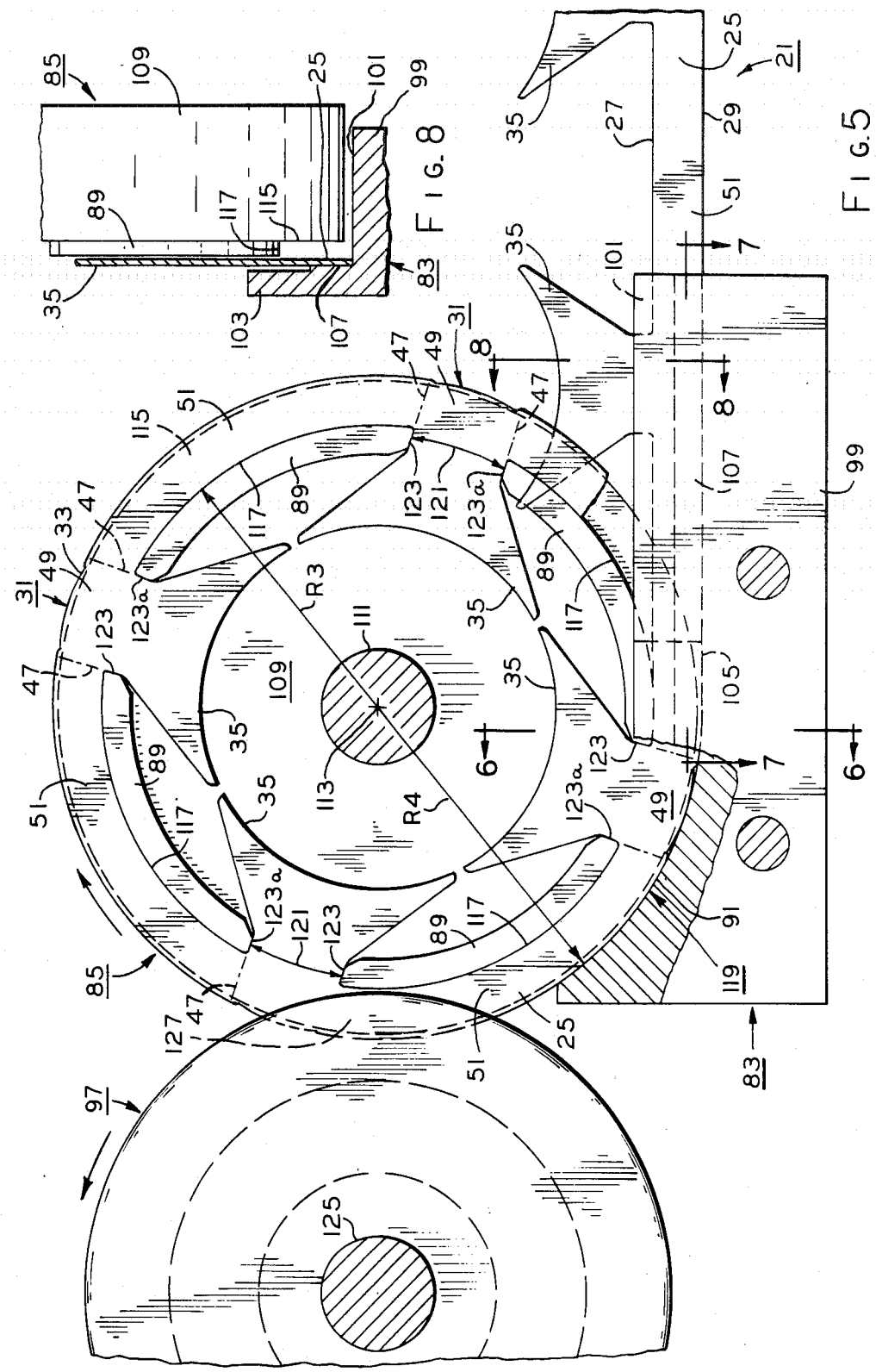

APPARATUS FOR CONTINUOUSLY FORMING EDGEWISE WOUND SALIENT POLE CORES

CROSS-REFERENCE TO RELATED APPLICATION

This application is a continuation-in-part of the commonly assigned U.S. patent application Ser. No. 660,211 filed Oct. 12, 1984 (now U.S. Pat. No. 4,613,780 issued Sept. 23, 1986), which is incorporated herein by reference and is also related to the commonly assigned U.S. patent applications Ser. No. 660,101 filed Oct. 12, 1984, Ser. No. 660,116 filed Oct. 12, 1984 and Ser. No. 680,762 filed Dec. 12, 1984 which are also incorporated by reference herein.

FIELD OF THE INVENTION

This invention relates in general to dynamoelectric machines and in particular to apparatus for continuously forming edgewise wound salient pole cores.

BACKGROUND OF THE INVENTION

In the past various different apparatus and methods have been utilized for effecting the edgewise deformation of a continuous lanced strip of generally thin ferromagnetic material into a plurality of generally helical convolutions thereof and accumulating such helical convolutions into a generally annular stack thereof so as to form an edgewise wound core for a dynamoelectric machine. Further, at least some of the aforementioned past apparatus and methods have been utilized to edgewise wind non-salient or distributed field cores of the usual type having teeth extending radially inwardly from a circumferential yoke section and also of the inside-out type with the teeth extending radially outwardly from the yoke section. Of course, the distributed field edgewise wound core has a relatively large number of teeth per helical convolution of the continuous lanced strip, such as for instance twenty-four teeth or more per helical convolutions, and such teeth are relatively narrow in width between the tips thereof and the yoke section.

Others of the aforementioned past apparatus and methods have been utilized to edgewise wind salient pole cores of the inside-out type with the salient pole pieces thereof extending radially outwardly from the yoke section. In comparison with the teeth of the distributed field edgewise wound core, the salient pole pieces of the salient pole edgewise wound core are appreciably fewer in number, such as for instance two, four, six or eight pole pieces per helical convolution, and the width or arcuate length of the salient pole pieces between the tips thereof and the yoke section may be appreciably greater than that of the teeth of the distributed field edgewise wound core.

It is believed, however, that some difficulties or problems may have been encountered in the past in attempting to edgewise wind a salient pole core from a continuous lanced strip of generally thin ferromagnetic material with the salient pole pieces of such salient pole core extending radially inwardly from a circumferential yoke section thereof. For instance, the bore defining free end edge on each salient pole piece of a four pole salient pole edgewise wound core may extend through an arc of up to at least about eighty-seven degrees about the bore of such core. Due to the above discussed relatively large width of the free end edge or tip of each salient pole piece, it is believed that interfering engagement of such salient pole piece tips on the continuous lanced strip with parts of the edgewise winding apparatus may have been encountered resulting in the aforementioned problem in past attempts to edgewise wind a salient pole core with the salient pole pieces extending radially inwardly from the circumferential yoke section. Another problem which may have been encountered in past attempts to edgewise wind a salient pole core is believed to be that such cores may not have had a generally uniform circumferential surface about the yoke section thereof.

SUMMARY OF THE INVENTION

Among the several objects of the present invention may be noted the provision of an improved apparatus for continuously forming an edgewise wound salient pole core which overcomes, at least in part, the problems or difficulties discussed above, as well as others, with respect to the prior art; the provision of such improved apparatus in which only preselected spaced apart segments in the yoke section of the lanced strip are generally edgewise or arcuately deformed to effect the edgewise deformation of the lanced strip into a plurality of generally helical convolutions thereof; the provision of such improved apparatus in which other segments in the yoke section of the lanced strip integrally interposed between the deformed segments remain undeformed; the provision of such improved apparatus in which a set of spaced apart salient pole pieces on the lanced strip and integral with the undeformed segments in the yoke section are also undeformed; the provision of such improved apparatus in which at least the salient pole pieces on the lanced strip are deflected or canted to obviate interfering engagement with parts of the apparatus during the edgewise winding of the salient pole core; and the provision of such improved apparatus in which the component parts utilized therein are simple in design, easily assembled and economically manufactured. These as well as other objects and advantageous features of the present invention will be in part apparent and in part pointed out hereinafter.

In general and in one form of the invention, apparatus is provided for continuously forming edgewise wound cores from a continuous lanced strip of generally thin ferromagnetic material. The continuous lanced strip includes a yoke section extending generally lengthwise through and having a pair of sets of segments therein with the segments of one of the segment sets being integrally interposed between the segments of the other of the segment sets, and a set of salient pole teeth integral with the segments of the one segment set in the yoke section extend generally laterally therefrom, respectively. The apparatus comprises a pair of means operable generally for effecting generally edgewise deformation of only the segments of the other of the segment sets in the yoke section of the continuous lanced strip upon the continuous passage of at least the yoke section of the continuous lanced strip between the edgewise deformation effecting means thereby to continuously generate a plurality of generally helical convolutions of the continuous lanced strip, respectively.

BRIEF DESCRIPTION OF THE DRAWINGS

FIG. 4 is a side elevational view showing parts of the apparatus of FIG. 3;

FIG. 5 is a partial sectional view taken along line 5—5 in FIG. 4;

FIGS. 6, 7 and 8 are partial sectional views taken along lines 6—6, 7—7 and 8—8 in FIG. 5, respectively;

Corresponding reference characters indicate corresponding parts throughout the several views of the drawings.

The exemplifications set out herein illustrate the preferred embodiments of the invention in one form thereof, and such exemplifications are not to be construed as limiting either the scope of the invention or the scope of the disclosure in any manner.

DETAILED DESCRIPTION OF THE PREFERRED EMBODIMENT

Figure 1:
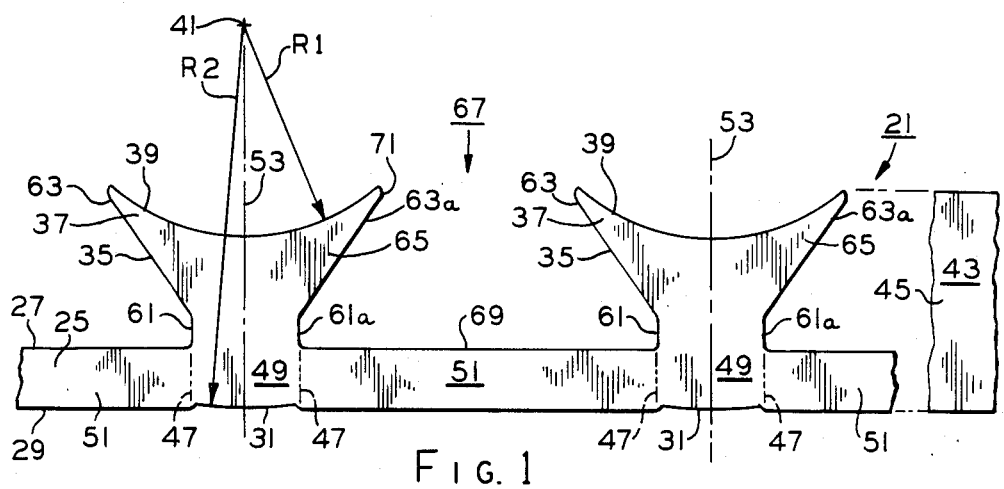
FIG. 1 is a front elevational view showing a part of a lanced strip formed from strip stock of a generally thin ferromagnetic material.
Figure 2:
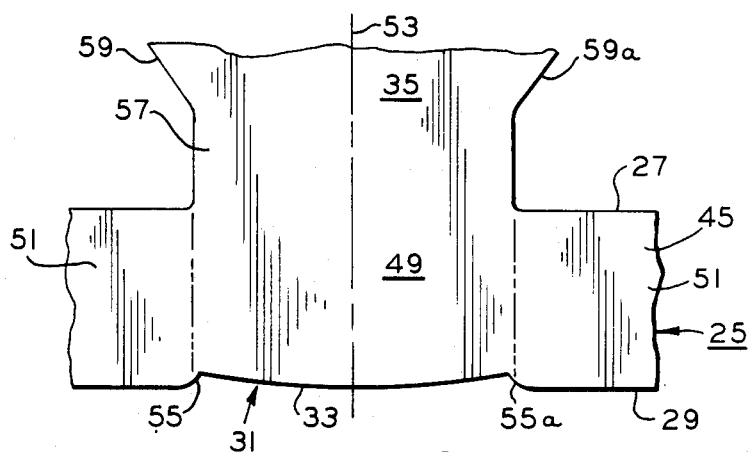
FIG. 2 is an enlarged partial front elevational view of the lanced strip of FIG. 1.
Figure 10:
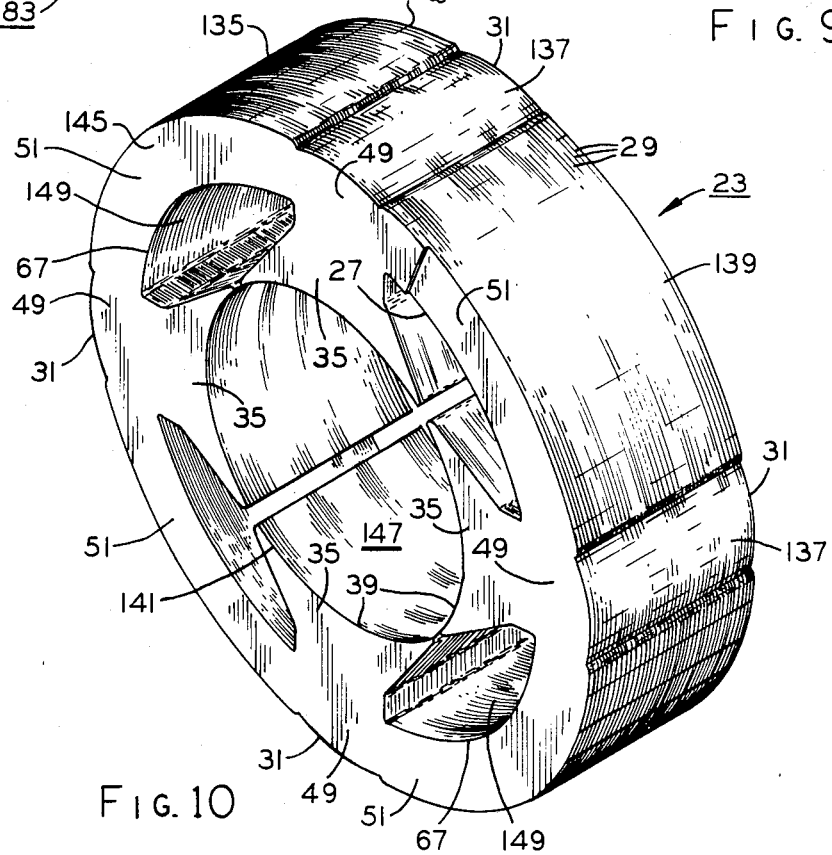
FIG. 10 is a perspective view showing the edgewise wound salient pole core as formed by the apparatus of FIG. 3.

With reference now to the drawings in general there is illustrated a continuous lanced strip 21 of generally thin ferromagnetic material adapted to be edgewise wound into a salient pole core 23 for a salient pole dynamoelectric machine (FIGS. 1, 2 and 10). Lanced strip 21 has a continuous yoke section 25 extending generally lengthwise thereof, and the yoke section includes a pair of opposite edges 27, 29 and a set of spaced apart notches 31 in opposite edge 29 with each notch having an arcuate or base edge 33 therein, respectively (FIGS. 1 and 2). A set of spaced apart salient pole pieces or teeth 35 are integral with opposite edge 27 extending generally laterally from yoke section 25 generally opposite notches 31 therein, and the salient pole teeth include a set of free end sections 37 each having another arcuate edge 39 defining at least a part thereof and with respective ones of base edges 33 and arcuate edges 39 having a common centerpoint 41, respectively (FIG. 1).

More particularly and with specific reference to FIGS. 1 and 2, lanced strip 21 may be lanced or otherwise formed by suitable means well known to the art, such as progressive die sets or the like for instance, from a strip stock 43 of generally thin ferromagnetic material having the desired electrical characteristics and the physical properties desirable to enhance edgewise winding of the lanced strip, as discussed in greater detail hereinafter. Strip stock 43 has a pair of opposite faces 45, 45a (only face 45 being shown in FIGS. 1 and 2) which, of course, bound yoke section 25 and salient pole teeth 35 of lanced strip 21.

Dotted lines 47 indicate the integral interposition or interconnection of a pair of sets of segments 49, 51 provided in yoke section 25 so as to extend generally lengthwise thereof between inner and outer opposite edges 27, 29 on the yoke section, and it may be noted that segments 49 define integral junctures between adjacent ones of segments 51 and salient pole teeth 35, respectively. Salient pole teeth 35 span or are aligned generally about a set of preselected pitch axes 53 therefor which are predeterminately spaced apart from each other generally lengthwise of lanced strip 21, and it may be noted that notches 31 and segments 49 in yoke section 25 also span or are aligned generally about the pitch axes, respectively. Scalloped notches 31 in opposite edge 29 on yoke section 25 are each provided with a pair of opposed side edges or sidewalls 55, 55a with arcuate base edge or base wall 33 being interposed therebetween. It may be noted that the lengths of notches 31 between opposed side edges 55, 55a thereof are no greater than the preselected width of root sections 57 on salient pole teeth 35, and it may also be noted that the apexes of base edges 33 of the notches are arranged to be at least generally coextensive with outer opposite edge 29 on yoke section 25, as discussed in greater detail hereinafter.

Salient pole teeth 35 each have a pair of opposite side edges 59, 59a, and the opposite side edges include first opposite side edge portions 61, 61a and second opposite side edge portions 63, 63a, respectively. First opposite side edge portions 61, 61a intersect with opposite edge 27 on yoke section 25 at least generally at the intersections of segments 49, 51 therein, so denoted by dotted lines 47; therefore, root sections 57 of salient pole teeth 35 and the preselected width of the root sections are defined between the first opposite side edge portions, and the root sections are integrally formed with segments 49 generally at inner opposite edge 27 on yoke section 25, respectively. Second opposite side edge portions 63, 63a intersect with first opposite side edge portions 61, 61a and extend generally divergently therefrom to also intersect with arcuate edge 39, such as a free end edge or tooth tip, provided on each salient pole tooth 35; therefore, each salient pole tooth has its free end section 37 integral with root sections 57 and bounded by the second opposite side edge portions and the arcuate free end edge, respectively. Although previously mentioned, it may be further noted that respective ones of free end edges 39 on salient pole teeth 35 and base edges 33 in notches 31 have common centerpoint 41, as illustrated by radius arrows R1, R2, and it may be further noted that centerpoints 41 are located on pitch axes 53, respectively. Additionally, it may also be noted that the width of free end sections 37 of salient pole teeth 35 generally at free end edges 39 thereof is substantially greater than the width of root sections 57 of the salient pole teeth. While the configuration of salient pole teeth 35 is set out hereinabove for purposes of disclosure, it is contemplated that other salient pole teeth having various different configurations may be utilized on lanced strip 21 within the scope of the invention so as to meet at least some of the objects thereof.

A set of slots 67, such as winding receiving slots or the like for instance, are provided through lanced strip 21 at least adjacent segments 51 in yoke section 25 and between adjacent ones of salient pole teeth 35. Each of slots 67 have a closed end or closed end portion 69 communicating with an open end or open end portion 71 thereof. Closed end portions 69 of slots 67 are defined at least adjacent inner opposite edge 27 on yoke section 25 generally between the intersection therewith of opposed ones of opposite side edges 59, 59a on adjacent ones of salient pole teeth 35, respectively. To complete the description of lanced strip 21, open end portions 71 of slots 67 are arranged to extend generally between the intersections of free end edges 39 on adjacent ones of salient pole teeth 35 with opposed ones of opposite side edges 59, 59a thereon, respectively.

With reference again to the drawings in general and recapitulating at least in part with respect to the foregoing, there is illustrated generally at 81 apparatus in one form of the invention for continuously forming edgewise wound salient pole cores 23 from continuous lanced strip 21 (FIGS. 1-12). Apparatus 81 has a die or die means 83 and rotatable or rotation means, such as a rotatable arbor or mandrel 85 or the like for instance, and the die and rotatable mandrel are operable generally for effecting edgewise or flatwise deformation of lanced strip 21 into a plurality of helical convolutions 87 thereof upon the continuous passage at least yoke section 25 of the lanced strip between the die and the rotatable mandrel (FIGS. 3-9). Rotatable mandrel 85 includes a set of generally arcuate means, such as arcuate lands or projections 89 or the like for instance, conjointly rotatable therewith for successively constraining at least parts of inner opposite edge 27 on yoke section 25 between successive salient pole teeth 35 on lanced strip 21 (FIGS. 1, 4 and 5). Die 83 includes means, such as an arcuate surface or die surface 91 or the like for instance, for constraining only spaced parts of outer opposite edge 29 on yoke section 25 of lanced strip 21 which are located generally opposite the at least parts of the inner opposite edge thereon successively constrained by projections 89, respectively (FIGS. 1, 4 and 5).

Figure 3:
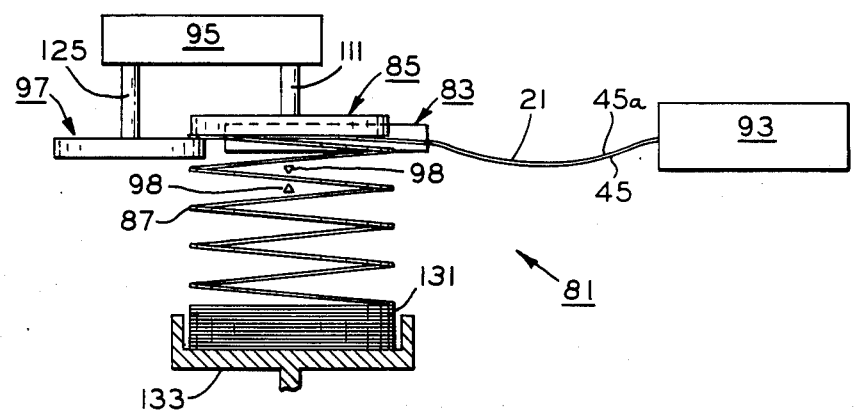
FIG. 3 is a schematic view showing apparatus in one form of the invention for continuously forming edgewise wound salient pole cores for a salient pole dynamoelectric machine from the lanced strip of FIG. 1 and illustrating principles which may be practiced in a method of operating such apparatus as well as principles which may be practiced in a method of forming edgewise wound salient pole cores

More particularly and with specific reference to FIG. 3, apparatus 81 is provided with a source, as indicated schematically at 93, for lanced strip 21, and as well known to the art, such source may comprise a multiple die set for forming the lanced strip from strip stock 43; however, it is also contemplated that such source may comprise a reel or the like of the lanced strip, as also well known to the art. Driving means, as indicated schematically at 95, is operable generally for effecting the conjoint rotation of rotatable mandrel 85 and a rotatable disc, such as a presser or pinch wheel 97 or the like for instance, generally in opposite directions, as illustrated by directional arrows in FIG. 5, and the rotatable mandrel and disc respectively define means for gripping engagement with at least yoke section 25 of lanced strip 21 to effect the continuous passage thereof between die 83 and arcuate projections 89 on rotatable mandrel 85, as discussed in greater detail hereinafter. Means, such as cutters 98 or the like for instance, are operable generally for severing the lanced strip, as discussed hereinafter. In the event a more detailed discussion is required with respect to die 83, rotatable mandrel 85, source 93 or lanced strip 21, driving means 95, cutters 98 or rotatable disc 97, reference may be had to the aforementioned U.S. Pat. No. 4,613,780

Die 83, which may be referred to as a bending guide or deforming means, comprises a generally elongate block 99 of suitable die material, such as a stainless steel or the like for instance, and a recess 101 in one side of the block provides a flange or guide 103 thereon for generally flatwise receiving lanced strip 21 thereon, as best seen in FIGS. 5 and 6. Arcuate or bending surface 91 of die 83 is provided in recess 101 at least generally adjacent one end of die block 99, such as an exit end thereof for lanced strip 21, and the arcuate die surface is arranged generally adjacent and perpendicular to flange 103 on the die block. A generally straight or guide surface 105 in recess 101 of die block 99 blends with arcuate die surface 91 and extends therefrom through the other end of the die block, such as an entry end thereof for lanced strip 21. At the entry end of die block 99, it may be noted that flange 103 is provided with a slightly beveled or angular surface 107 thereon of a preselected length and against which at least yoke section 25 of lanced strip 21 is generally flatwise received to effect momentary deflection or canting of salient pole teeth 35 on the lanced strip, as best seen in FIGS. 7 and 8 and as discussed in greater detail hereinafter. Albeit not shown herein for purposes of drawing simplification and brevity of disclosure, die block 99 may be resiliently urged by suitable means toward rotatable mandrel 85.

Rotatable mandrel 85 has a generally cylindric head 109 mounted to a spindle or shaft 111 which is rotatably driven by driving means 95 therefor, and the head and shaft are rotatable about a preselected axis 113 therefor which defines a winding axis for apparatus 81, as best seen in FIGS. 3-5. Head 109 is in part disposed in recess 101 of die 83, and a lower, generally annular, flat circumferential surface 115 is provided on the head so as to be disposed in part in spaced apart overlaying relation with flange 103 of die 83 at least generally at arcuate die surface 91 on the die. Arcuate projections 89 are arranged in an interrupted generally circular pattern thereof on head 109 depending therefrom adjacent circumferential surface 115, respectively, as best seen in FIGS. 3-6. A set of arcuate or strip engagement surfaces 117 of a preselected arcuate length are provided on projections 89 intersecting with circumferential surface 115 of head 109, and the projection arcuate surfaces are predeterminately arranged so as to extend generally in opposed radial spaced apart relation with arcuate die surface 91 in recess 101 of die 83 upon the aforementioned rotation of rotatable mandrel relative to the die. In this vien, projection arcuate surfaces 117 are predeterminatedly arranged in equidistant radially spaced relation about preselected winding axis 113, as indicated by radius arrow R3 in FIG. 5, and the preselected winding axis defines a common centerpoint for both the projection arcuate surfaces and arcuate die surface 91, as illustrated by a radius arrow R4 for the arcuate die surface; therefore, the projection arcuate surfaces and the arcuate die surfaces are predeterminately radially spaced apart when in facing relation with each other. Thus, it may be noted that the aforementioned spaced apart relation of projection arcuate surfaces 117 and arcuate die surface 91 and the spaced overlaying relation of circumferential surface 115 on head 109 with flange 103 in recess 101 of die block 99 generally at the arcuate die surface thereof defines a preselected edgewise deformation passage, zone or path 119 through apparatus 81 between rotatable mandrel 85 and die 83 for the continuous passage therethrough of at least yoke section 25 of lanced strip 21, as discussed in greater detail hereinafter. Of course, the aforementioned predetermined radial spaced relation between projection arcuate surfaces 117 and arcuate die surface 91 is generally dictated by the width between opposite edges 27, 29 on yoke section 25 of lanced strip 21, and the overlaying spaced relation between circumferential surface 115 of head 109 and flange 103 in recess 101 of die block 99 is generally dictated by the thickness of the lanced strip between opposite faces 45, 45a thereof; however, while lanced strip 21 is illustrated herein for purposes of disclosure, it is contemplated that different lanced strips having various different thicknesses and yoke sections with various different widths may be utilized A set of spaces or gaps 121 having a preselected arcuate length or width are provided between adjacent opposed ones of a pair of opposite ends or end portions 123, 123a on each of projections 89, and the opposite end portions of the projections define the aforementioned preselected arcuate lengths thereof, respectively. Gaps 121 are arranged to receive root sections 57 of salient pole teeth 35 on yoke section 25 of lanced strip 21 during the continuous passage thereof through preselected edgewise deformation path 119 of apparatus 81, as discussed in greater detail hereinafter; therefore, it may be noted that the preselected widths of the gaps are predeterminately greater than the preselected widths of the root sections of the salient pole teeth, respectively. As illustrated herein for purposes of disclosure, four projections 89 and four gaps 121 are shown with the projections extending through arcs of generally about seventy degrees (70°) and the gaps extending through arcs of generally about twenty degrees (20°); however, it is comtemplated that either more or fewer projections and gaps having various different arcuate lengths may be utilized within the scope of the invention so as to meet at least some of the objects thereof depending, of course, on the number of salient poles of the core being edgewise wound.

Rotatable disc 97 is mounted on a spindle or shaft 125 which is rotatably driven by driving means 95 conjointly with shaft 111 for head 109 of rotatable mandrel 85; therefore, the rotatable disc and mandrel are conjointly rotatable by the driving means, as previously mentioned. To complete the description of apparatus 81, disc 97 is provided with a generally flat, annular circumferential surface 127 disposed in part in opposed or overlaying relation with circumferential surface 115 on head 109 of rotatable mandrel 85, and circumferential surfaces 115, 127 are arranged in gripping engagement with opposite faces 45, 45a of lanced strip 21 on yoke section 25 thereof to draw or effect the continuous passage of at least the yoke section of the lanced strip through preselected edgewise deformation path 119 of the apparatus in response to the conjoint rotation of the rotatable disc and mandrel. The gripping engagement of circumferential surfaces 115, 127 of mandrel 85 and disc 97 with yoke section 25 of lanced strip 21 may be referred to as a pressing or gripping zone. Albeit not shown for purposes of drawing simplification and brevity of disclosure, either rotatable mandrel 85 or rotatable disc 97 may be urged by suitable resilient means toward the other thereof to effect or maintain a desired force of the gripping engagement between mandrel circumferential surface 115 and disc circumferential surface 127 with yoke section of lanced strip 21.

In the operation of apparatus 81, assume that the apparatus has been initially jogged or intermittently operated in a manner well known to the art thereby to place lanced strip 21 and component parts of the apparatus generally in the positions thereof illustrated in FIG. 5, and if a more detailed discussion of the aforementioned initial jogging of the apparatus to initially associate the lanced strip therewith is desired, reference may be had to the aforementioned U.S. Pat. No. 4,613,780 As may be best seen in FIGS. 3-6, lanced strip 21 is continuously fed or passed from source 93 thereof into die 83, and yoke section 25 of the lanced strip is generally flatwise engaged with flange 103 on the die block 99, i.e., opposite face 45a of the lanced strip on the yoke section thereof is arranged in facing relation or sliding engagement with the die flange, while outer opposite edge 29 on the yoke section is disposed in guiding or sliding engagement with guide surface 105 in the die block. Thus, in response to the clockwise rotation of mandrel 85 by driving means 95, as indicated by the rotational arrow therefor in FIG. 5, it may be noted that arcuate surfaces 117 on projections 89 of the mandrel are successively and independently rotated into constraining or edgewise deforming engagement with only inner opposite edges 27 on yoke section 25 of lanced strip 21 between adjacent or successive ones of salient pole teeth 35 thereon. As each arcuate surface 117 on projections 89 of mandrel 85 are rotated thereby through preselected edgewise deformation path or bending zone 119 between the mandrel and die 83 so as to be disposed in opposed facing relation with arcuate die surface 91, it may also be noted that only successive or spaced apart parts of outer opposite edge 29 on yoke section 25 of lanced strip 21 are disposed in constraining or edgewise deforming engagement with the arcuate die surface, and such spaced apart parts of the outer opposite edge are located on the yoke section generally opposite the parts of inner opposite edges 27 thereof between adjacent salient pole teeth 35 so as to be in constraining or deformation engagement with arcuate surfaces 117 on mandrel projections 89, respectively. In other words, only segments 51 in yoke section 25 of lanced strip 21 are edgewise or arcuately deformed during the passage of the lanced strip through preselected edgewise deformation path 119 between die 83 and rotatable mandrel 85 in response to the constraining engagement of inner and outer opposite edges 27, 29 on only segments 51 in the yoke section between successive projection arcuate surfaces 117 and arcuate die surface 91 when such projection arcuate surfaces are in opposed facing relation with the arcuate die surface, respectively.

During the above discussed continuous passage of yoke section 25 on lanced strip 21 through bending zone 119 between die 83 and rotatable mandrel 85 to effect the successive edgewise deformation of only segments 51 in the yoke section, root sections 57 on adjacent or successive ones of salient pole teeth 35 are received in successive ones of gaps 121 between projections 84 on the rotatable mandrel in response to the rotation thereof, as best seen in FIG. 7. It may be noted that salient pole teeth 35 on lanced strip 21, segments 49 in yoke section 25 of the lanced strip, and parts of outer opposite edge 29 on the yoke section bounding segments 49 are unconstrained between free end edges 39 of teeth 35 and arcuate edges 33 of notches 31 and thereby left undeformed, i.e., maintained in their original lanced configuration or condition, in response to the passage of segments 49 in the yoke section of the lanced strip through bending zone 119 of apparatus 81 between die 83 and rotatable mandrel 85 thereof, respectively. Thus, as illustrated in FIG. 7, the parts of outer opposite edge 29 on yoke section 25 bounding segments 49 therein are unconstrained by arcuate die edge 91 being displaced therefrom, respectively.

As lanced strip 21 is passed from source 93 thereof into the entry end of die 83, as best seen in FIGS. 3, 5 and 7, yoke section 25 of the lanced strip and root sections 57 of salient pole teeth 35 pass over or slide upon beveled surface 107 on flange 103 of die block in general flatwise relation or sliding engagement therewith. Therefore, the instantaneous engagement of that portion of yoke section 25 and that root section 57 of a particular one of salient pole teeth 35 with beveled surface 107 on flange 103 of die block 99 is effective to cause a deflection or canting of such particular one salient pole tooth through a preselected angularity so as to obviate interfering engagement between a free end section 37 thereof and an end portion 123 of one of the projections 89 on rotatable mandrel 85 being rotated thereby toward the above discussed edgewise constraining engagement with one of segments 51 on the yoke section, respectively. In view of the above, it may be noted that salient pole teeth 35 on lanced strip 21 are predeterminately terminately deflected from the path of projections 89 rotatable with mandrel 85 in order to obviate interfer engagement or abutment of free end sections 37 on the salient pole teeth with the projections on the rotatable mandrel. However, the free end section 37 of the particular deflected salient pole tooth 35 may engage or ride on a projection 89 as it is being rotated by rotatable mandrel toward bending zone 119 of apparatus 81 until a gap 121 between adjacent projections passes over the root section 57 of the particular deflected salient pole tooth in receiving relation therewith thereby to permit the particular deflected salient pole tooth to reassume its generally coplanar relation with yoke section 25 in lanced strip prior to the passage thereof through bending zone 119 in apparatus 81.

The previously discussed successive edgewise deformations of only segments 51 in yoke section 25 of lanced strip 21 while leaving segments 49 therein and salient pole teeth 35 undeformed during the passage of the lanced strip through bending zone 119 of apparatus 81 effects the edgewise deformation of the lanced strip into a plurality of generally helical convolutions 87 thereof, as best seen in FIGS. 3 and 4. Even though salient pole teeth 35 are undeformed, it may be noted that pitch axes 53 therefor are repositioned so as to extend generally radially with respect to helical convolutions 87 in response to the edgewise deformation of segments 57, respectively. Of course, the helical convolutions 87 of deformed lanced strip 21 passing from the exit end of die 83 is grippingly engaged between overlaying circumferential sufaces 115, 127 of rotatable mandrel 85 and rotatable disc 97, a best seen in FIGS. 4 and 5, and the gripping engagement of circumferential surfaces 115, 127 with yoke section 25 of such deformed helical convolution of the lanced strip is effective to draw or move the lanced strip from its source 93 through bending zone 119 of apparatus 81, as previously discussed.

Helical convolutions 87 of deformed lanced strip 21 passing from the exit end of die 83 are accumulated in a generally annular stack 131 thereof on a receiving means, such as a receiver or support 133 therefor, as best seen in FIG. 3. As helical convolutions 87 of deformed lanced strip 21 are accumulated in annular stack 131 thereof on receiver 133, yoke section 21 of the deformed lanced strip is disposed generally circumferentially about the annular stack, and the deformed parts of outer opposite edge 29 bounding deformed segments 51 in the yoke section and the undeformed parts of the outer opposite edge bounding undeformed segments 49 in the yoke section are arranged to form a generally circumferential surface 135 extending about the yoke section and generally axially across the annular stack. Further, during the aforementioned accumulation of helical convolutions 87 of deformed lanced strip 21 into annular stack 131, undeformed and deformed segments 49, 51 and salient pole teeth 35 are arranged or associated generally in pluralities of row formations 137, 139, 141 thereof extending generally axially across the annular stack with the salient pole teeth extending generally radially inwardly about their repositioned pitch axes 53 from the yoke section of the deformed lanced strip, respectively. At least generally as helical convolutions 87 of deformed lanced strip 21 accumulated in annular stock 131 thereof attain a preselected axial length or stack height for the annular stack, severing means or cutters 98 may be actuated in a manner well known to the art to sever one of the helical convolutions of the deformed strip. Albeit not shown for the sake of drawing simplification and brevity of disclosure, annular stack 131 may be removed from its receiver 133 subsequent to the operation of cutters 98 so that another annular stack of helical convolutions of the deformed strip may be accumulated on such receiver without interrupting the operation apparatus 81 to continuously form such helical convolutions of the deformed lanced strip. If a more detailed discussion of the constructions and/or operations of cutters 98 and receiver 133 is desired, reference may be had to the aforementioned U.S. Pat. No. 4,613,780

Figure 11:
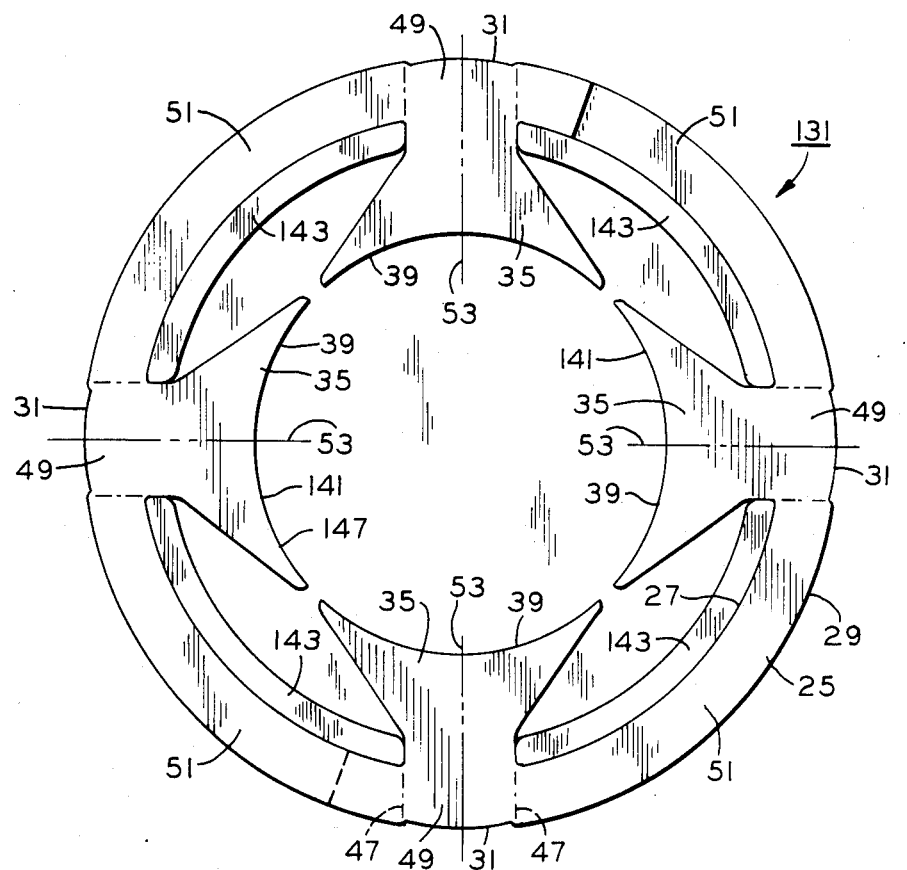
FIG. 11 is an end elevational view of the edgewise wound salient pole core of FIG. 10 and illustrating the axial alignment of the component parts of the edgewise wound salient pole core thereacross cn an aligning fixture.

Upon removal of such helical convolution stack 131 from receiver 133 therefor, such stack is placed about or associated with an aligning arbor 143, as shown in part in FIG. 11, in a manner well known to the art, and helical convolutions 87 in such stack are easily adjusted or repositioned with respect to each other to effect the axial alignment of undeformed segments 49, deformed segments 51 and undeformed salient pole teeth 35 into the axial row formations 137, 139, 141 thereof between a pair of opposite end faces 145, 145a on such stack thereby to define an edgewise wound core 23. Upon the above discussed alignment of helical convolution stack 131 on aligning arbor 143, free end edges 39 on salient pole teeth 35 in the axial row formations 141 thereof define in part an axially extending bore 147 through core 23 between opposite end faces 145, 145a thereon, and slots 67 in deformed lanced strip 21 are also disposed in pluralities of axial row formations 149 thereof between the aligned salient pole teeth so as to intersect with the opposite end faces on the edgewise wound core thereby to define winding receiving slots in such core, respectively. As previously mentioned, pitch axes 53 for salient pole teeth 35 are repositioned so as to extend generally radially with respect to core 23. Further, it may also be noted that, notches 31 in the undeformed parts of outer opposite edge 29 bounding undeformed segments 49 are also arranged in pluralities of aligned axial row formations in circumferential surface 135 of core 23 between opposite end faces 145, 145a thereof, and the arcuate base edges 33 of the notches serve to blend the undeformed parts of outer opposite edge 29 with the deformed parts thereof on deformed segments 51, respectively.

Figure 9:
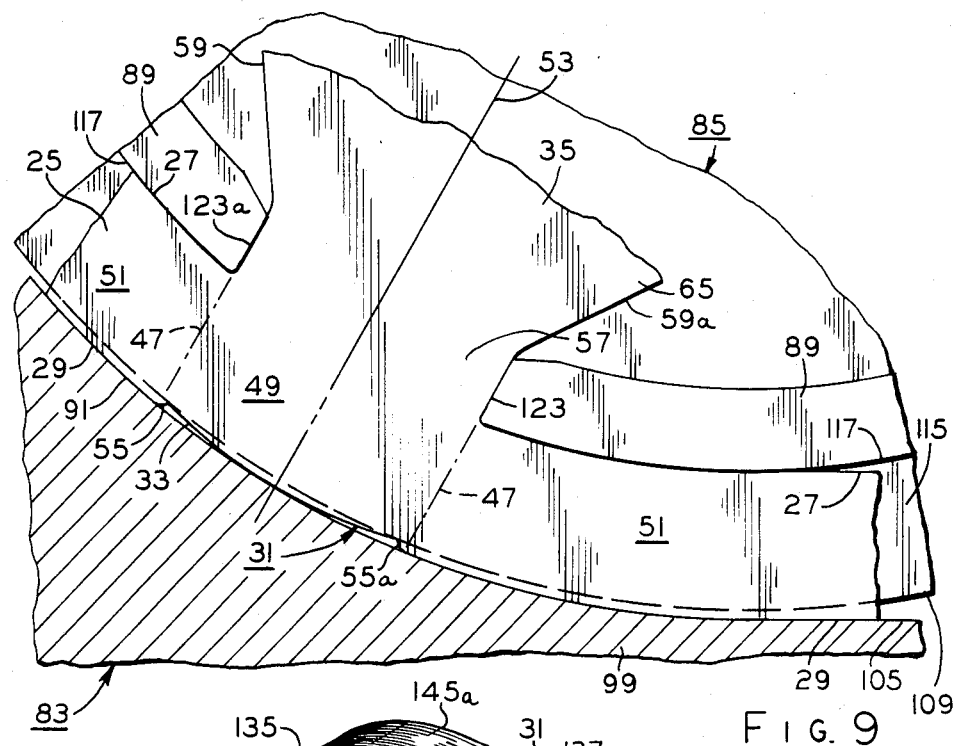
FIG. 9 is an enlarged elevational view taken from FIG. 5 but illustrating the unconstrained passage of an undeformed salient pole tooth and yoke segment associated therewith of the lanced strip between a mandrel and die for effecting edgewise deformation of the lanced strip.

With further reference to the drawings in general and again recapitulating at least in part with respect to the foregoing, there is illustrated a method of operating apparatus 81 for continuously forming edgewise wound salient pole cores 23 from continuous lanced strips 21 (FIGS. 1-12). In practicing this method, mandrel 85 is rotated relative to die 81 with continuous lanced strip 21 being passed therebetween (FIGS. 3-9). Arcuate projections 89 on mandrel 85 are successively engaged with at least parts of inner opposite edge 27 on yoke section 21 of the continuous lanced strip between adjacent ones of salient pole teeth 35, and thereby only parts of outer opposite edge 29 on the yoke section disposed generally opposite the parts of the inner opposite edge successively engaged by the projections are successively constrained in engagement with arcuate surface 91 on die 83 so as to effect edgewise deformation of the continuous lanced strip into helical convolutions 87 thereof in response to the rotation of the mandrel relative to the die, respectively (FIGS. 5, 6 and 9).

Figure 12:
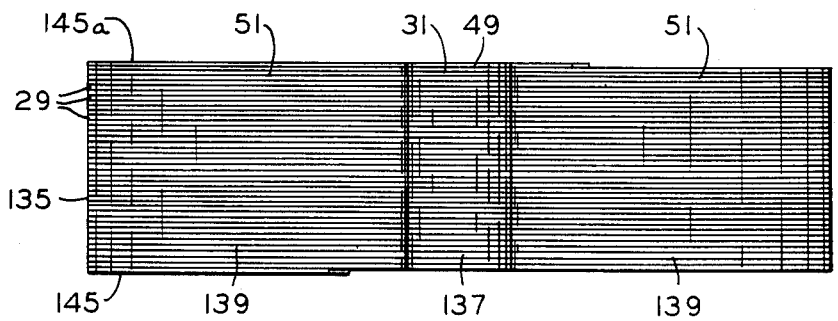
FIG. 12 is a side elevational view of the edgewise wound salient pole core of FIG. 11.

Also, edgewise wound salient pole core 23 comprises continuous lanced strip 21 generally edgewise and helically wound into the core (FIGS. 10-12). Deformed segments 51 and undeformed segments 49 are integrally interposed between each other in continuous lanced strip 21 and arranged generally in pluralities of generally axially extending row formations 137, 139 across core 23, and the row formations of the deformed and undeformed segments define a generally circumferential yoke section 21 of the core, respectively (FIG. 9). Undeformed salient pole teeth 35 on continuous lanced strip 21 integral with undeformed segments 49 thereof are arranged about pitch axes 53 therefor in pluralities of row formations 141 thereof so as to define in part generally axial bore 147 therein, respectively (FIGS. 10 and 11).

Further, a method is illustrated from the foregoing for forming an edgewise wound salient pole core 23 (FIGS. 1-12). In practicing this method, successive segments 51 in yoke section 25 of lanced strip 21 are successively and independently edgewise constrained along at least a part thereof, and salient pole teeth 35 and segments 49 are left unconstrained (FIGS. 5 and 9). Only the at least parts of edgewise constrained segments 51 are successively and independently deformed, and the constrained salient pole teeth 35 and segments 49 are maintained in the original lanced configurations thereof (FIGS. 5, 10 and 11).

From the foregoing, it is now apparent that novel apparatus 81 has been presented meeting the objects set forth hereinabove, as well as others, and it is contemplated that changes as to the precise arrangements, shapes, connections and details of the constructions illustrated herein by way of example for purposes of disclosure may be made by those having ordinary skill in the art without departing from the spirit of the invention or the scope thereof which is defined by the claims which follow.

What I claim as new and desire to secure by Letters Patent of the United States is:

1. Apparatus for continuously forming edgewise wound salient pole cores from a plurality of edgewise wound helical convolutions of a continuous lanced strip of generally thin ferromagnetic material, the lanced strip including a yoke section extending generally lengthwise thereof, a pair of generally opposite edges on the yoke section, a plurality of spaced apart salient pole teeth extending generally laterally from the yoke section, each salient pole tooth having a root section integral with one of the opposite edges and a free tip end with the free tip end having a width substantially greater than that of the root section, a plurality of spaced apart notches om the other of the opposite edges generally opposite the root sections with the notches having a width no greater than that of the root sections, and a pair opposite faces on the lanced strip defining in part the salient pole teeth and the yoke section, respectively, the apparatus comprising:

die means for the continuous passage therethrough of at least the yoke section and including an arcuate surface arranged in constraining and deforming engagement only with parts of the other opposite edge spanning between the notches, a sloped entrance surface on said die means and engaged with one of the opposite faces at least at the yoke section so as to momentarily deflect each salient pole tooth into a tilted position when the one opposite face passes across said sloped entrance surface;

a mandrel rotatable about a preselected axis therefor and associated with said die means, said mandrel including a generally flat surface generally perpendicular to the preselected axis, a set of fixed arcuate projections extending from said flat surface in equidistant radially spaced relation about the preselected axis and conjointly rotatable with said mandrel, successive ones of said fixed arcuate projections being rotated across the free tip end on successive salient pole teeth in their tilted positions without interfering engagement between said fixed arcuate projections and the salient pole teeth and into successive constraining and deforming engagements with parts of the one opposite edge spanning between adjacent root sections when the other opposite edge parts are in the successive contraining and deforming engagements thereof with said arcuate surface so as to form the lanced strip into the helical convolutions generally as they exit from said die means, and a set of gaps between adjacent ones of said fixed arcuate projections and conjointly rotatable with said mandrel to successively receive successive ones of the root sections on the salient pole teeth with the free tip ends thereof being unconstrained, respectively; and a rotatable disc associated with said mandrel and having another generally flat surface disposed in part in overlaying relation with said first named flat surface on said mandrel, said first named and another flat surfaces being engaged in gripping relation with the opposite faces on the yoke section of the helical convolution exiting from said die means so as to continuously draw thelanced strip between said arcuate surface and said fixed arcuate projections in response to the conjoint rotation of said disc and said mandrel.

2. Apparatus for continuously forming edgewise wound salient pole cores from a plurality of edgewise wound helical convolutions of a continuous lanced strip of generally thin ferromagnetic material, the lanced strip including a yoke section extending generally lengthwise thereof, a pair of generally opposite edges on the yoke section, and a plurality of spaced apart salient pole teeth extending generally laterally from the yoke section, each salient pole tooth having a root section integral with one of the opposite edges and a free tip end with the free tip end having a width substantially greater than that of the root section, and a plurality of notches in the other of the opposite edges generally opposite the root sections with each notch having a width no greater than the root section width, respectively, the apparatus comprising:

die means for the continuous passage therethrough of at least the yoke section of the lanced strip and including an arcuate surface in constraining and deforming engagement with only parts of the other opposite edge between the notches, and means engaged with at least the yoke section for momentarily deflecting each salient pole tooth into a tilted position;

means for rotation about a preselected axis and including means for gripping engagement with the yoke section, a set of fixed arcuate means generally equidistantly radially spaced about the preselected axis and conjointly rotatable with said rotation means, successive ones of said fixed arcuate means being rotated across the free tip end on successive ones of the salient pole teeth in their tilted position without interfering engagement and into successive constraining and deforming engagements with parts of the one opposite edge between adjacent root sections and generally opposite the other opposite edge parts when the other opposite edge parts are in the constraining and deforming engagements thereof with said arcuate surface, and a set of means between adjacent fixed arcuate means for receiving the root sections of successive salient pole teeth with the free tip ends thereof being unconstrained, respectively; and rotatable means for conjoint rotation with said rotation means and including another means for gripping engagement with the yoke section in part generally opposite said first named gripping engagement means, said first named and another gripping engagement means being engaged with the yoke section of the helical convolution exiting from said die means thereby to continuously draw the lanced strip between said arcuate surface and said fixed arcuate means in response to the conjoint rotation of said rotation means and said rotatable means.

3. Apparatus for continuously forming edgewise wound salient pole cores from a plurality of helical convolutions of a lanced strip of generally thin ferromagnetic material, the lanced strip including a yoke section extending generally lengthwise thereof, a pair of generally opposite edges on the yoke section, and a plurality of spaced apart salient pole teeth integral with one of the opposite edges and extending generally laterally from the yoke section, respectively, the apparatus comprising:

die means and rotatable means associated with each other and operable generally for forming the lanced strip into the helical convolutions upon the continuous passage of the lanced strip between said die means and said rotatable means, said rotatable means including a set of fixed arcuate means conjointly rotatable with said rotatable means for successively constraining parts of the one opposite edge between successive salient pole teeth without constraining the salient pole teeth, and said die mean including means for constraining only spaced apart parts of the other of the opposite edges located generally opposite the one opposite edge parts as they are successively constrained by said fixed arcuate means, and other parts of the other opposite edge intermediate the spaced apart parts and generaly opposite the salient pole beeth being unconstrained by said constraining means, respectively.

4. Apparatus as set forth in set forth in claim 3 wherein said die means further includes means associated with at least the yoke section for canting the salient pole teeth thereby to obviate interfering engagement of successive ones of the salient pole teeth with successive ones of said fixed arcuate means as they are rotated by said rotatable means to successively constrain the one opposite edge parts, respectively.

5. Apparatus as set forth in claim 3 wherein each salient pole tooth includes a root section integral with the one opposite edge part, and a free tip end spaced from the root section, and wherein said rotatable means further includes a set of means for receiving the root sections of successive ones of the salient pole teeth without constraining the free tip ends thereof, respectively.

6. Apparatus as set forth in claim 3 further comprising means for conjoint rotation with said rotatable means, said conjoint rotation means and said rotatable means each including means associated in part in overlaying relation for gripping engagement with the helical convolutions generally as then exit from said die means so as to continuously draw the lanced strip between said die means and said rotatable means in response to the conjoint rotation of said rotatable means and said conjoint rotation means, respectively.

7. Apparatus for continuously forming edgewise wound cores from a plurality of helical convolutions of a continuous lanced strip of generally thin ferromagnetic material, the lanced strip including a yoke section extending generally lengthwise thereof and having a pair of sets of segments with the segments of one segment set being integrally interposed between the segments of the other of the segment sets, and a plurality of salient pole teeth integral with the segments of one of the one and other segment sets and extending generally laterally therefrom, respectively, the apparatus comprising:

die means and rotatable means associated with each other and operable generally for edgewise constraining therebetween only the segments of the other of the one and other segment sets and without constraining the salient pole teeth and the segments of the one and other segment sets upon the continuous passage of the lanced strip between said die means and said rotatable means thereby to continuously form the lanced strip into the helical convolutions, respectively.

8. Apparatus as set forth in claim 7 wherein said rotatable means includes a set of fixed arcuate means conjointly rotatable therewith for successive edgewise engagements with only the segments of the other of the one and other segment sets, respectively.

9. Apparatus as set forth in claim 8 wherein said die means includes another fixed arcuate means for edgewise engagement with only the segments of the other of the one and other segment sets and arranged generally opposte said first named fixed arcuate means when said first named fixed arcuate means are rotated by said rotatable into the edgewise engagments with the segments of the other of the one and other segment sets, respectively.

10. Apparatus a set forth in claim 8 wherein the salient pole teeth include a plurality of root sections integral with the segments of the one of the one and other segment sets and wherein said rotatable means further includes a set of means interposed between adjacent ones of said fixed arcuate means for receiving successive ones of the root sections on the salient pole teeth, respectively.

11. The apparatus as set forth in claim 9 wherein the lanced strip further includes a plurality of notches in the segments of the one of one and other segment sets generally opposite the salient pole teeth, the nothches being unconstrained by said another fixed arcuate means and the salient pole teeth being unconstrained by said rotatable means upon the continuous passage of the lanced strip between said another arcuate means and said rotatable means, respectively.

12. The apparatus as set forth in claim 11 wherein the lanced strip further includes a plurality of root sections on the salient pole teeth intersecting with the segments of the one of the one and other segment sets generally opposite the notches, the notches having a width along the segments of the one of the one and other segment sets no greater than the width of the root sections along the segments of the one of the one and other segment sets, respectively.

13. Apparatus as set forth in claim 7 further comprising means for conjoint rotation with said rotatable means, and said conjoint rotation means and said rotatable means each including means associated in part in overlaying relation for gripping engagement with the helical convolutions generally as they exit said die means so as to continuously draw the lanced strip between said die means and said rotatable means in response to the conjoint rotation of said rotatable means and said conjoint rotation means, respectively.

14. Apparatus as set forth in claim 8 wherein said salient pole teeth include a plurality of root sections integral with the segments of the one of the one and other segment sets, and a plurality of free tip ends spaced from the root sections with the free tip ends having a width substantially greater than that of the root sections, and wherein said die means includes means associated with at least the yoke section for effecting momentary deflection of successive ones of the salient pole teeth at least upon the entry of the lanced strip into said die means to obviate interfering engagement between the free tip ends on the successive ones of the salient pole teeth and successive ones of said fixed arcuate means generally as said fixed arcuate means are rotated by said rotatable means toward the edgewise engagements with the segments of the other of the one and other segment sets, respectively.

15. Apparatus for continuously forming edgewise wound cores from a continous lanced strip of generally thin ferromagnetic material, the continuous lanced strip including a yoke section extending generally lengthwise thereof and having a pair of sets of segments therein with the segments of one of the segment sets being integrally interposed between the segments of the other of the segment sets, and a set of salient pole teeth integral with the segments of the one segment set in the yoke section and extending generally laterally therefrom, respectively, the apparatus comprising:

a pair of means operable generally for effecting generally edgewise deformation of only the segments of the other of the segment sets in the yoke section of the continuous lanced strip upon the continuous passage of at least the yoke section of the continuous lanced strip between said edgewise deformation effecting means thereby to continuously generate a plurality of generally helical convolutions of the continuous lanced strip, respectively.

16. Apparatus as set forth in claim 15 wherein one of said edgewise deformation effecting means is rotatable relative to the other of said edgewise deformation effecting means and includes a rotatable portion associated in gripping engagement with one of the helical convolutions of the lanced strip.

17. Apparatus as set forth in claim 16 further comprising rotatable means for gripping engagement with the one helical convolution generally in opposed relation to the gripping engagement therewith of said rotatable portion of said one edgewise deformation effecting means thereby to draw the lanced strip between said edgewise deformation effecting means, respectively.

18. Apparatus as set forth in claim 15 wherein one of said edgewise deformation effecting means is rotatable relative to the other of said edgewise deformation effecting means and includes a set of fixed arcuate means for successive edgewise engagements with only the segments of the other segment sets, respectively.

19. Apparatus as set forth in claim 18 wherein said other edgewise deformation effecting means includes an arcuate portion for edgewise engagement with only the segments of the other segment sets generally opposite the successive edgewise engagements therewith of said fixed arcuate means, respectively.

20. Apparatus as set forth forth in claim 18 wherein said other edgewise deformation effecting means includes means associated with at least the yoke section and operable generally for effecting momentary deflection of at least the salient pole teeth thereby to obviate interfering engagement of the salient pole teeth with said fixed arcuate means generally as said fixed arcuate means are rotated by said one edgewise deformation effecting means toward the edgewise engagements with only the segments of the other segment set, respectively.

21. Apparatus as set forth in claim 18 wherein said one edgewise deformation effecting means further includes a set of means interposed between adjacent ones of said fixed arcuate means for receiving successive ones of the salient pole teeth upon the continuous passage of the yoke section between said edgewise deformation effecting means thereby to obviate edgewise deformation of the successive salient pole teeth and the segments of the one segment set integral therewith, respectively.

22. The apparatus as set forth in claim 15 wherein the lanced strip further includes a plurality of notches in the segments of the one segment set generally opposite the salient pole teeth, the notches and the salient pole teeth being spaced from said edgewise deformation effecting means so as to remain undeformed thereby upon the continuous passage of the lanced strip between said edgewise deformation effecting means, respectively.

23. The apparatus as set forth in claim 22 wherein the lanced strip further includes a plurality of root sections on the salient pole teeth intersecting with the segments of the one segment set, the notches having a width along the segments of the one segment set no greater than the width of the root sections along the segments of the one segments set, respectively.

24. The apparatus as set forth in claim 23 wherein the lanced strip further includes a plurality of free end sections on the salient ple teeth, the free end sections having a width substantially greater than the widths of the notches and the root sections and also being spaced from one of the edgewise deformation effecting means upon the continuous passage of the lanced strip between said edgewise deformation effecting means, respectively.

25. Apparatus for continuously forming edgewise wound salient pole cores from a plurality of generally helical convolutions of a continuous lanced strip of generally thin ferromagnetic material, the lanced strip including a yoke, a pair of generally opposite edges on the yoke, a plurality of spaced apart nothches in one of the opposite edges, a plurality of spaced apart salient pole teeth extending generally laterally from the other of the opposite edges, respectively, and each salient pole tooth having a free tip end spaced from a root section intersecting with the other opposite edge generally opposite one of the notches, the apparatus comprising:

die means and rotatable means operable generally for edgewise constraining and deforming engagement with only the opposite edges spanning between adjacent notches and adjacent root sections so as to edgewise deform only segments of the yoke spanning between the adjacent notches and the adjacent root sections when the lancdd strip is passed between said die means and said rotatable means thereby to continuously form the lanced strip into the helical convolutions, the notches being unconstrained by said die means and the free tip ends being unconstrained by said rotatable means thereby to obviate deformation of the salient pole teeth and other segments of the yoke disposed between the opposite notches and root sections when the lanced strip is passed between said die means and said rotatable means, respectively.

26. The apparatus as set forth in claim 25 wherein said rotatable means includes a set of arcuate projections fixedly arranged in a spaced apart and generally circular pattern on said rotatable means so as to conjointly rotate with said rotatable means into successive edgewise constraining and deforming engagements with the other opposite edge spanning between the adjacent root sections when said die means is in the edgewise constraining and deforming engagement with the one opposite edge spanning between the adjacent notches, respectively.

27. The apparatus as set forth in claim 25 wherein said die means includes a generally arcuate surface associated in the edgewise constraining and deforming engagement with only the one opposite edge spanning between the adjacent notches when said rotatable means is in the edgewise constraining and deforming engagment with only the other opposite edge spanning between the adjacent root sections, respectively.

28. The apparatus as set forth in claim 26 wherein the lanced strip further includes a plurality of free tip ends on the salient pole teeth spaced from the root sections, and wherein said die means includes an entry portion receiving the lanced strip and having means engaged with at least the yoke for momentarily tilting successive ones of the salient pole teeth to obviate interfering engagement between the free tip ends on the successive ones of the salient pole teeth and successive ones of said arcuate projections rotated by said rotatable means toward the successive edgewise constraining and deforming engagements with the other opposite edge spanning between the adjacent root sections, respectively.

* * * * *